(12) United States Patent
Morikage et al.

(10) Patent No.: US 11,214,419 B2
(45) Date of Patent: Jan. 4, 2022

(54) SEALING CAP

(71) Applicant: KABUSHIKI KAISHA TOYOTA JIDOSHOKKI, Aichi (JP)

(72) Inventors: Yuki Morikage, Aichi-ken (JP); Atsushi Shibata, Aichi-ken (JP); Koji Ishii, Aichi-ken (JP); Hiromichi Ogawa, Aichi-ken (JP)

(73) Assignee: KABUSHIKI KAISHA TOYOTA JIDOSHOKKI, Aichi (JP)

( * ) Notice: Subject to any disclaimer, the term of this patent is extended or adjusted under 35 U.S.C. 154(b) by 414 days.

(21) Appl. No.: 16/041,260

(22) Filed: Jul. 20, 2018

(65) Prior Publication Data
US 2019/0031412 A1 Jan. 31, 2019

(30) Foreign Application Priority Data

Jul. 31, 2017 (JP) .............................. JP2017-148078

(51) Int. Cl.
*B65D 59/02* (2006.01)
*F04B 39/12* (2006.01)
(Continued)

(52) U.S. Cl.
CPC .............. *B65D 59/02* (2013.01); *F04B 17/05* (2013.01); *F04B 39/121* (2013.01); *F04B 39/14* (2013.01); *F16J 13/14* (2013.01)

(58) Field of Classification Search
CPC ........ B65D 59/02; F04B 17/05; F04B 39/121; F04B 39/123; F04B 39/14; F16J 13/14
See application file for complete search history.

(56) References Cited

U.S. PATENT DOCUMENTS

| 2,329,242 | A | * | 9/1943 | Best | .......................... | A47K 1/14 |
| | | | | | | 4/295 |
| 3,659,738 | A | * | 5/1972 | Friedmann | ........... | B65D 51/007 |
| | | | | | | 220/287 |
| 9,133,934 | B2 | | 9/2015 | Yoneda et al. | | |

FOREIGN PATENT DOCUMENTS

| JP | 7-44810 | 11/1995 |
| JP | 3124207 | 7/2006 |

(Continued)

OTHER PUBLICATIONS

Korean Office Action dated Aug. 21, 2019 in Korean Application No. 20-2018-0003457 and English Translation thereof.

*Primary Examiner* — Anthony D Stashick
*Assistant Examiner* — Blaine G Neway
(74) *Attorney, Agent, or Firm* — Greenblum & Bernstein, P.L.C.

(57) ABSTRACT

A sealing cap for a compressor is made of an elastically-deformable material and includes a plug portion, a bolt insertion portion, a tab portion, and a plate-like body portion. The plug portion is to be inserted into a fluid port of a compressor to plug the fluid port. The plate-like body portion integrally joins the plug portion, the bolt insertion portion, and the tab portion. The bolt insertion portion extends from a front surface of the body portion. The tab portion is formed on the front surface of the body portion. The plug portion is projectingly formed on a rear surface of the body portion. The tab portion includes a ring having an annular shape, and is located opposite to the bolt insertion portion across the plug portion. The ring has an opening that extends through the ring in a direction that crosses insertion direction of the plug portion.

5 Claims, 8 Drawing Sheets

(51) Int. Cl.
  *F04B 39/14* (2006.01)
  *F16J 13/14* (2006.01)
  *F04B 17/05* (2006.01)

(56) References Cited

FOREIGN PATENT DOCUMENTS

| | | |
|---|---|---|
| JP | 2007-083747 | 4/2007 |
| JP | 2010-30600 | 2/2010 |
| JP | 2012-67648 | 4/2012 |
| JP | 2013-133911 | 7/2013 |

\* cited by examiner

SEALING CAP

BACKGROUND ART

The present disclosure relates to a sealing cap, particularly to a sealing cap for plugging a suction port and a discharge port as the fluid ports of a compressor through which refrigerant flows.

Japanese Patent Application Publication No. 2012-67648 discloses a conventional sealing cap for a compressor. The sealing cap disclosed in the Publication is made of an elastically-deformable material and includes a plug portion for plugging a fluid port, a tab portion which is configured for being gripped by fingers, and a joint portion that integrally joins the plug portion and the tab portion. The joint portion includes a bolt insertion portion that permits insertion of a stud bolt that is mounted to the compressor. The tab portion is formed at a position that is closer to the plug portion than to the bolt insertion portion in the longitudinal direction of the joint portion. The joint portion has a cutout that is formed adjacent to the plug portion and is in communication with the bolt insertion hole. When removing the sealing cap from a connection portion of the compressor, the cutout allows the plug portion to bend and deform even if the plug portion contacts with the stud bolt. The sealing cap of the Publication No. 2012-67648 offers an advantageous effect that the sealing cap can be removed from the compressor without causing difficulty, while allowing the plug portion that had been removed to contact with the stud bolt of the compressor.

However, according to the sealing cap of Japanese Patent Application Publication No. 2012-67648, the tab portion is formed so as to protrude from the joint portion in the longitudinal direction of the joint portion. In the case that the sealing cap of the Publication is mounted to a compressor of a vehicle, the tab portion protruding from the joint portion may interfere with other components disposed in an engine compartment of the vehicle. In such case, the components can be obstacles when a worker tries to hook his/her finger through the tab portion to remove the sealing cap. Further, sealing caps in general are required to be removable with less pulling force so as to reduce the strain on fingers.

The present disclosure has been made in view of the above circumstances and is directed to providing a sealing cap that does not interfere with other components and that is removable reliably from a compressor.

SUMMARY

In accordance with an aspect of the present disclosure, there is provided a sealing cap configured to be used for a compressor that includes a pipe connecting portion to which a pipe for flowing a fluid therethrough is to be connected, a fluid port that is opened to an end face of the pipe connecting portion, and a stud bolt that extends from the end face of the pipe connecting portion. The sealing cap is made of an elastically-deformable material and includes a plug portion, a bolt insertion portion, a tab portion, and a plate-like body portion. The plug portion is configured to be inserted into the fluid port to plug the fluid port. The bolt insertion portion has a cylindrical shape and is configured to permit insertion of the stud bolt. The tab portion is configured to be gripped. The plate-like body portion integrally joins the plug portion, the bolt insertion portion, and the tab portion. The bolt insertion portion extends from a front surface of the body portion. The tab portion is formed on the front surface of the body portion. The plug portion is projectingly formed on a rear surface of the body portion. The tab portion includes a ring having an annular shape and is located opposite to the bolt insertion portion across the plug portion. The ring has an opening that extends through the ring in a direction that crosses insertion direction of the plug portion.

Other aspects and advantages of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

First Embodiment

Figure 1:
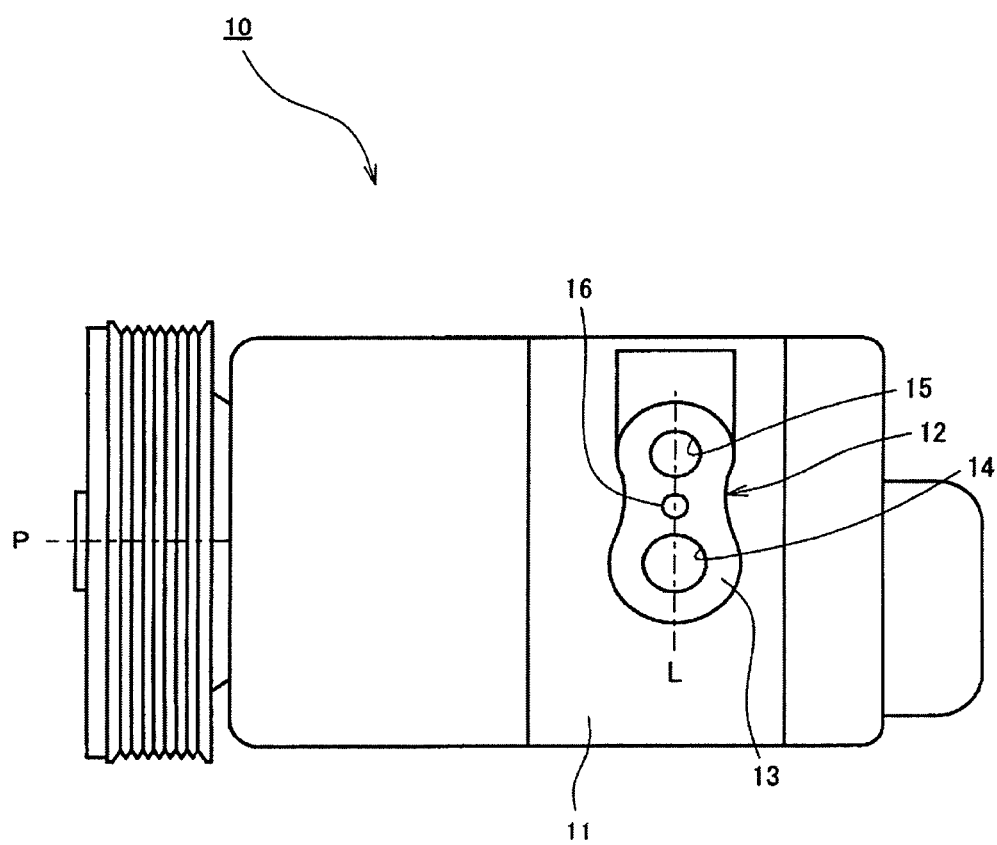
FIG. 1 is a plan view of a compressor to which a sealing cap according to a first embodiment of the present disclosure is to be mounted.
Figure 2:
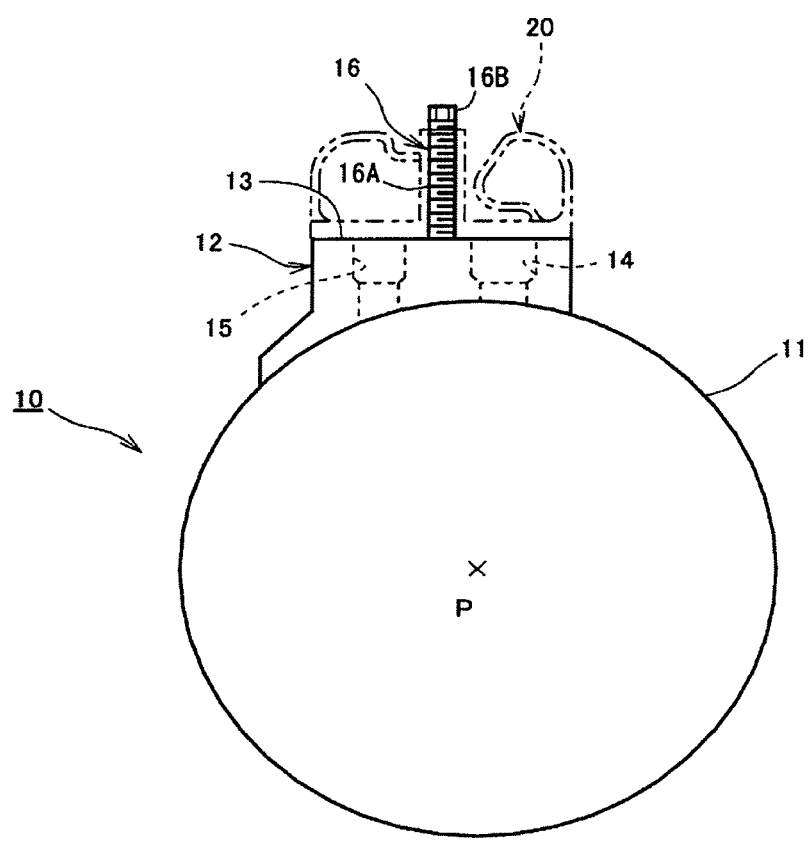
FIG. 2 is a front view of the compressor to which the sealing cap according to the first embodiment is to be mounted.

The following will describe a sealing cap according to a first embodiment of the present disclosure with reference to the accompanying drawings. A compressor 10 illustrated in FIGS. 1 and 2 is a compressor for a vehicle, and has a housing 11 that is formed by a cylinder block, a front housing member, and rear housing member. A pipe connecting portion 12 is provided to the housing 11. Pipes for flowing refrigerant as a fluid are to be connected to the pipe connecting portion 12. The pipe connecting portion 12 includes a suction port 14 as the first fluid port and a discharge port 15 as the second fluid port. The suction port 14 and the discharge port 15 are opened to an end face 13 of the pipe connecting portion 12. A stud bolt 16 is mounted to the compressor 10 so as to be located between the suction port 14 and the discharge port 15 and extend vertically from the end face 13. The stud bolt 16 is a bolt for fixing the pipes connected to the pipe connecting portion 12. The stud bolt 16 has an externally-threaded shank portion 16A and a head portion 16B that is formed at one end of the shank portion 16A and has a nut shape. The stud bolt 16 is tightened in a threaded hole formed in the pipe connecting portion 12.

According to the first embodiment, at the pipe connecting portion 12 of the compressor 10, the suction port 14, the discharge port 15, and the stud bolt 16 are arranged so that their centers are located on an imaginary line L of FIG. 1. As illustrated in FIGS. 1 and 2, the compressor 10 having the pipe connecting portion 12 on its top is fixed in an engine compartment of the vehicle substantially horizontally so that a rotational axis P of the compressor 10 extends horizontally.

Figure 3:
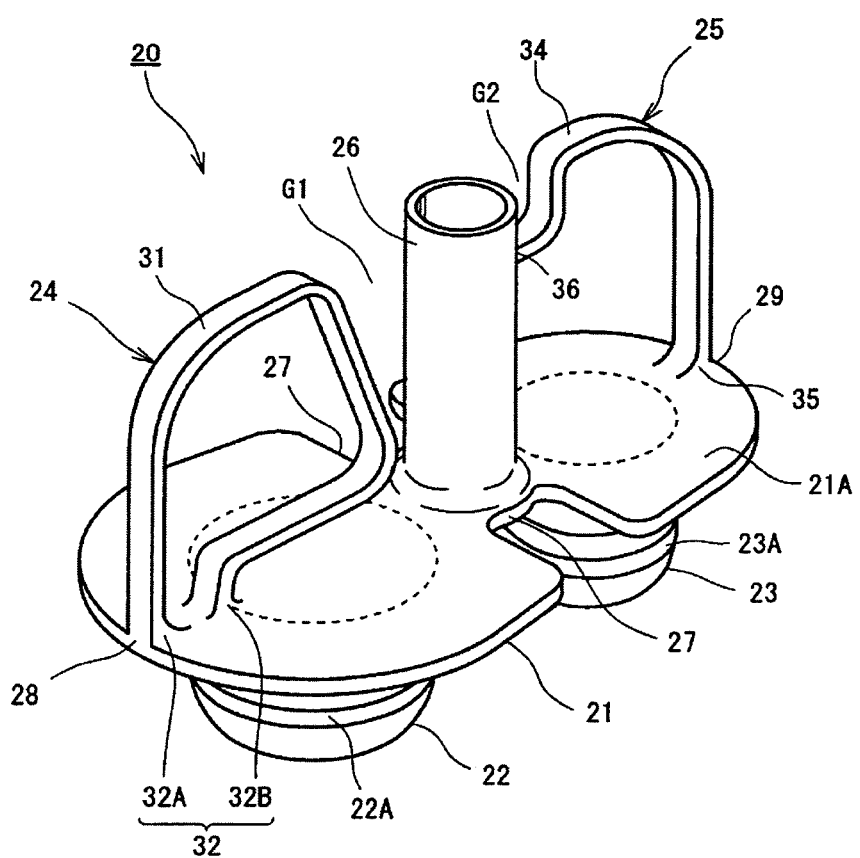
FIG. 3 is a perspective view of the sealing cap according to the first embodiment.
Figure 4A:
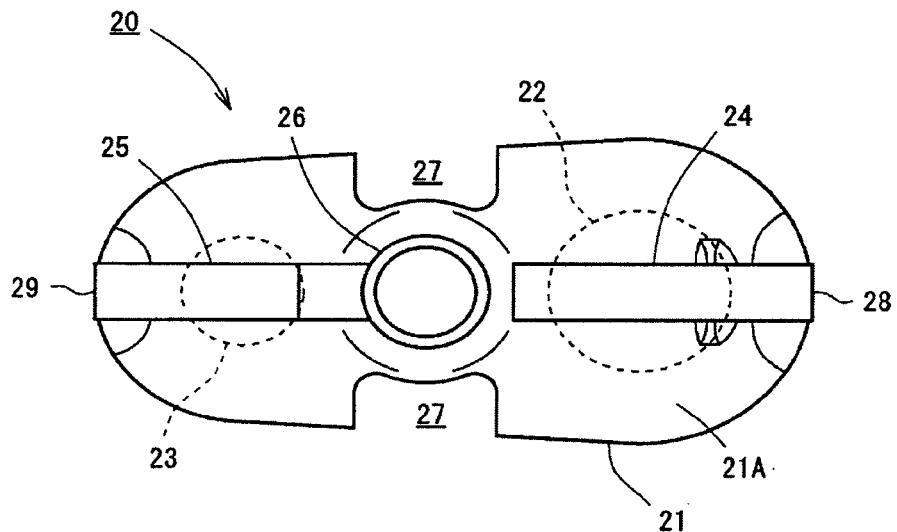
FIG. 4A is a plan view of the sealing cap according to the first embodiment.
Figure 4B:
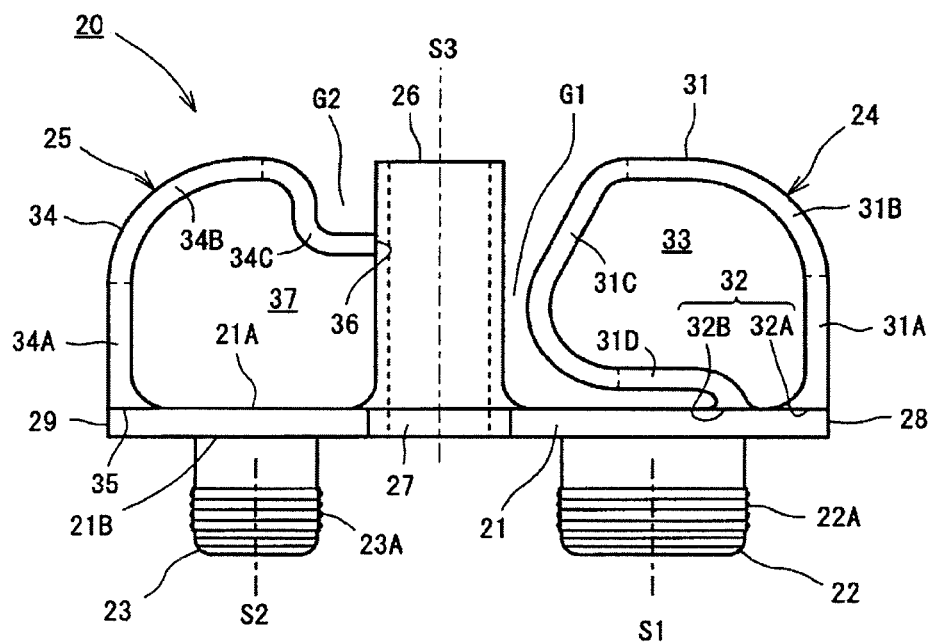
FIG. 4B is a side view of the sealing cap according to the first embodiment.

FIGS. 3, 4A, and 4B illustrate a sealing cap 20 of the first embodiment that is to be mounted to the pipe connecting portion 12 for plugging the suction port 14 and the discharge port 15. The sealing cap 20 is, for example, made of a resin material, such as a polyurethane, or a rubber-based material, which are elastically deformable when pressed by human. The sealing cap 20 includes a plate-like body portion 21, a first plug portion 22, a second plug portion 23, a first tab portion 24, a second tab portion 25, and a bolt insertion portion 26. The first plug portion 22 and the first tab portion 24 are located corresponding to the suction port 14, and the second plug portion 23 and the second tab portion 25 are located corresponding to the discharge port 15.

The first plug portion 22, the second plug portion 23, the first tab portion 24, the second tab portion 25, and the bolt insertion portion 26 are joined integrally by the plate-like body portion 21. The bolt insertion portion 26 extends from a front surface 21A of the body portion 21 substantially at an intermediate position of the front surface 21A in a longitudinal direction (or a lengthwise direction) of the body portion 21. The first plug portion 22 and the second plug portion 23 are projectingly formed on a rear surface 21B of the body portion 21 and are arranged along the longitudinal direction of the body portion 21 with the bolt insertion portion 26 located therebetween. The body portion 21 has two cutout portions 27 on opposite sides of the bolt insertion portion 26 in a shorter direction (or the width direction) of the body portion 21 that is orthogonal to the longitudinal direction thereof. Therefore, the width of the intermediate portion of the body portion 21 is reduced by the cutout portions 27. The body portion 21 has opposite ends 28 and 29 in the longitudinal direction thereof.

The first plug portion 22 for plugging the suction port 14 is formed in a columnar shape and includes an annular rib portion 22A that is formed along an outer peripheral surface of the first plug portion 22. The first plug portion 22 has a hollow portion (not shown) that is recessed from an extending end of the first plug portion 22. The first plug portion 22 is adapted to be inserted into the suction port 14 by press-fitting to plug the suction port 14. Therefore, the diameter of the first plug portion 22 is determined in accordance with the bore diameter of the suction port 14. The first plug portion 22 extends along its center axis S1 that is orthogonal to the plane of the rear surface 21B of the body portion 21.

The second plug portion 23 for plugging the discharge port 15 is formed in a columnar shape. The second plug portion 23 also includes an annular rib portion 23A that is formed along an outer peripheral surface of the second plug portion 23 and has a hollow portion (not shown) that is recessed from an extending end of the second plug portion 23. The second plug portion 23 is adapted to be inserted into the discharge port 15 by press-fitting to plug the discharge port 15. Therefore, the diameter of the second plug portion 23 is determined in accordance with the bore diameter of the discharge port 15. The second plug portion 23 extends along its center axis S2 that is orthogonal to the plane of the rear surface 21B of the body portion 21.

The bolt insertion portion 26 has a cylindrical shape and permits insertion of the stud bolt 16. The bolt insertion portion 26 is located between the first plug portion 22 and the second plug portion 23. According to the first embodiment, the bolt insertion portion 26 is formed on the front surface 21A of the body portion 21 at an intermediate position in the longitudinal direction thereof. The bolt insertion portion 26 extends along its center axis S3 that is orthogonal to the plane of the front surface 21A. When the sealing cap 20 is mounted to the pipe connecting portion 12 of the compressor 10, the stud bolt 16 is inserted in the bolt insertion portion 26, and most part of the stud bolt 16 is covered by the bolt insertion portion 26, leaving out the end portion thereof that includes the head portion 16B.

The first tab portion 24 and the second tab portion 25 are adapted to facilitate the removal of the sealing cap 20 from the pipe connecting portion 12. The first tab portion 24, which is located on the side of the suction port 14, includes a ring 31. The ring 31 is connected at the end 28 of the body portion 21 to stand upright at the end 28 on the front surface 21A, and extends along the longitudinal direction of the body portion 21 while forming an annular shape. That is, the ring 31 has opposite connecting ends 32 that are connected to the body portion 21. The first tab portion 24 and the bolt insertion portion 26 are located opposite to each other across the first plug portion 22 in the longitudinal direction of the body portion 21. The first tab portion 24 and the second tab portion 25 are adapted to be gripped by a worker to remove or pull the sealing cap 20 out.

As shown in FIG. 4B, the connecting ends 32 are connected to the end 28, which is one longitudinal end of the body portion 21, or, the side of the first plug portion 22. The connecting ends 32 include a first connecting end 32A and a second connecting end 32B. The first connecting end 32A is connected to the end 28 of the body portion 21. The second connecting end 32B is connected at a position that is closer to the bolt insertion portion 26 than the first connecting end 32A is to the bolt insertion portion 26 in the longitudinal direction of the body portion 21. The second connecting end 32B is located at a position that is closer to the first connecting end 32A than the center axis S1 of the first plug portion 22 is to the first connecting end 32A in the longitudinal direction of the body portion 21. The first tab portion 24 is formed so as not to protrude from the body portion 21. Specifically, the first tab portion 24 does not protrude from the end 28 in the longitudinal direction of the body portion 21 and does not protrude from the edges of the body portion 21 in the direction that is orthogonal to the longitudinal direction of the same (that is, the width direction of the body portion 21).

As shown in FIG. 4B, the ring 31 according to the first embodiment includes a vertical portion 31A, an arcuate portion 31B, a curved portion 31C, and a horizontal portion 31D. For the ease of explanation, the boundaries between the above-described portions 31A to 31D of the ring 31 are marked by dash lines in FIG. 4B.

The vertical portion 31A extends from the first connecting end 32A in a direction that is orthogonal to the plane of the front surface 21A. The arcuate portion 31B continues from the vertical portion 31A and extends toward the bolt insertion portion 26 while forming an arcuate shape. The arcuate portion 31B is the portion of the first tab portion 24 that is most distant from the body portion 21. The curved portion 31C continues from the arcuate portion 31B and extends toward the body portion 21 while forming a curve. The curved portion 31C is a portion of the first tab portion 24 that is closest to the bolt insertion portion 26. A gap G1 is provided between the curved portion 31C and the bolt insertion portion 26. The gap G1 is located apart from the arcuate portion 31B. The gap G1 increases as the curved portion 31C extends toward the arcuate portion 31B and also toward the body portion 21 from a point in the curved portion 31C closest to the bolt insertion portion 26. The horizontal portion 31D continues from the curved portion 31C and extends substantially in parallel with the plane of the front surface 21A of the body portion 21. The horizontal portion 31D is connected to the second connecting end 32B. Part of the ring 31 is connected to the front surface 21A so as to be located above the first plug portion 22.

The vertical portion 31A, the arcuate portion 31B, the curved portion 31C, and the horizontal portion 31D form an opening 33 of the ring 31 that extends through the ring 31 in a direction that crosses the insertion direction of the first plug portion 22. The opening 33 permits a worker to insert his/her finger therethrough to pull the first tab portion 24. The connecting ends 32 are connected to the end 28 of the body portion 21. Therefore, when the worker inserts a finger through the opening 33 and pulls the first tab portion 24 up in the direction of removing the sealing cap 20 (i.e., in the direction that is parallel with the center axis S1), the body portion 21 is deformed in such a manner that the end 28 is lifted first and then the first plug portion 22 is removed from the suction port 14. By applying a pulling force to the portion of the first plug portion 22 near the end 28, the first plug portion 22 can be removed from the suction port 14 with less pulling force, as compared with the case of simply pulling the first plug portion 22 along the center axis S1.

The second tab portion 25 will now be described in detail. The second tab portion 25, which is located on the side of the discharge port 15 opposite to the suction port 14, is formed upright on a part of the front surface 21A of the body portion 21 that is on the side of the second plug portion 23 opposite to the first plug portion 22 and extends along the longitudinal direction of the body portion 21. The second tab portion 25 and the bolt insertion portion 26 cooperate to form an annular shape. The second tab portion 25 includes an extension 34 that extends upward from the front surface 21A of the body portion 21 and then along the longitudinal direction of the body portion 21 while forming a curve. The extension 34 includes a first end 35 and a second end 36. The first end 35 is connected to the end 29 of the body portion 21. The second end 36 is connected to an outer peripheral surface of the bolt insertion portion 26. The second tab portion 25 is formed so as not to protrude from the body portion 21. Specifically, the second tab portion 25 does not protrude from the end 29 in the longitudinal direction of the body portion 21 and does not protrude from the edges of the body portion 21 in the direction that is orthogonal to the longitudinal direction of the same (the width direction of the body portion 21).

The extension 34 according to the first embodiment includes a vertical portion 34A, an arcuate portion 34B, and a cranked portion 34C. For the ease of explanation, the boundaries between the above-described portions 34A to 34C of the extension 34 are marked by dash lines in FIG. 4B.

The vertical portion 34A extends upward from the end 29 of the body portion 21 and along the longitudinal direction of the body portion 21. One end of the vertical portion 34A that is connected to the body portion 21 corresponds to the first end 35. The arcuate portion 34B is a portion that continues from the vertical portion 34A and extends toward the bolt insertion portion 26 while forming an arcuate shape. The arcuate portion 34B is the portion of the second tab portion 25 that is most distant from the body portion 21. The cranked portion 34C is a portion that continues from the arcuate portion 34B and is bent into a crank shape so as to extend toward the body portion 21 and then toward the bolt insertion portion 26. A gap G2 is provided between the cranked portion 34C and the bolt insertion portion 26.

Figure 5:
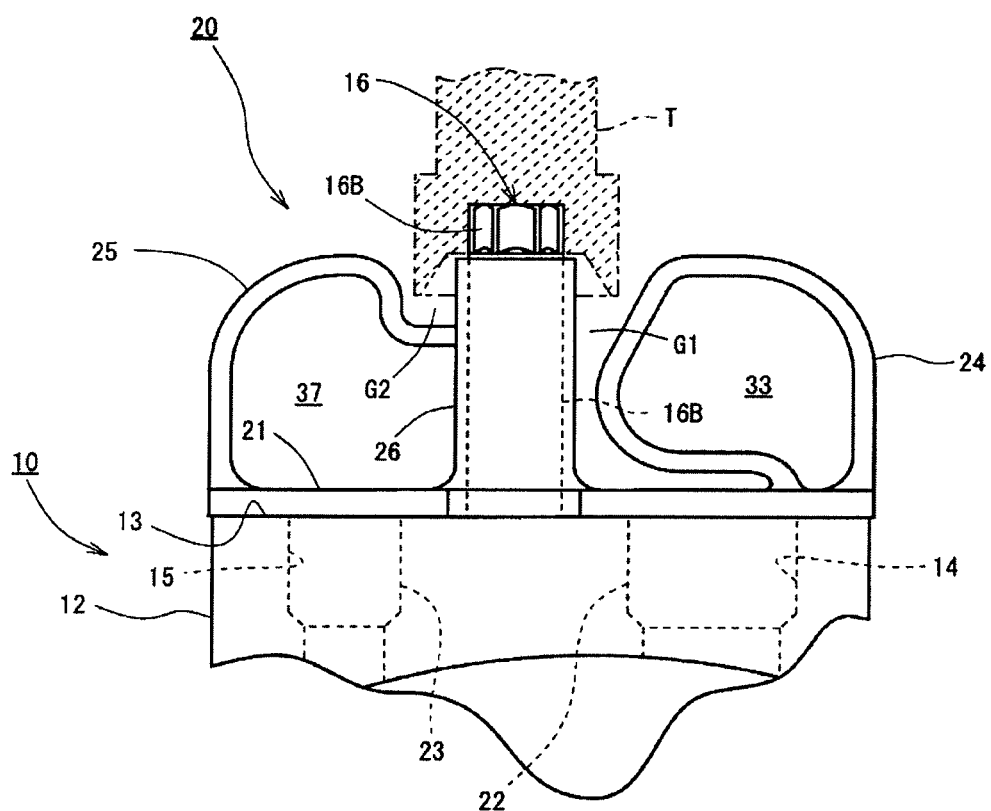
FIG. 5 is a side view of the sealing cap according to the first embodiment that is mounted to the compressor.

As illustrated in FIG. 5, the gaps G1 and G2 prevent interference between the sealing cap 20 and a tool, such as an impact wrench T that is used when mounting and tightening the stud bolt 16 to the compressor 10. In FIG. 5, a socket of the impact wrench T is illustrated by imaginary lines.

In the second tab portion 25, the extension 34 includes the vertical portion 34A, the arcuate portion 34B, and the cranked portion 34C. The extension 34, the body portion 21, and the bolt insertion portion 26 cooperate to form an opening 37 that extends through the second tab portion 25 in a direction that crosses the insertion direction of the second plug portion 23. The opening 37 permits a worker to insert a finger therethrough to pull the second tab portion 25. When the worker inserts a finger in the opening 37 and pulls the second tab portion 25 up in the direction of removing the sealing cap 20 (i.e., in the direction that is parallel with the center axis S2), the second plug portion 23 and the bolt insertion portion 26 are removed from the suction port 14 and the stud bolt 16, respectively.

The following will describe the steps of removing the sealing cap 20 from the compressor 10 according to the first embodiment. The compressor 10 is installed in an engine compartment of a vehicle such that the stud bolt 16 mounted to the pipe connecting portion 12 extends in the vertical direction. When the sealing cap 20 is attached to the pipe connecting portion 12 of the compressor 10, the suction port 14 is plugged by the first plug portion 22 and the discharge port 15 is plugged by the second plug portion 23.

Figure 6A:
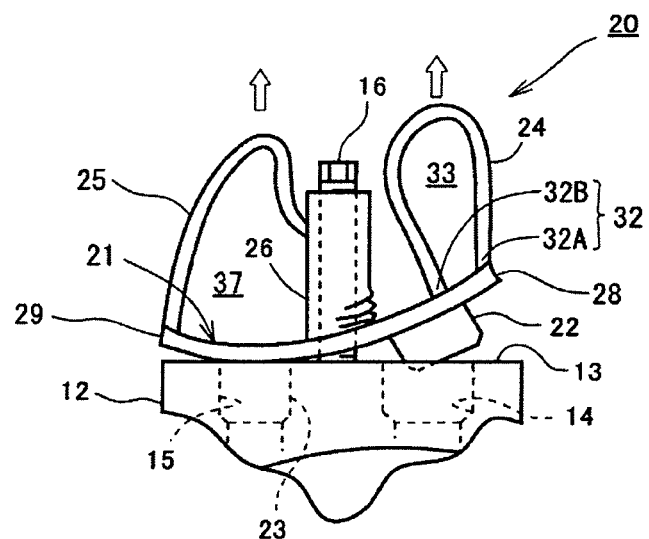
FIG. 6A is a view for describing a step of removal of the sealing cap according to the first embodiment.

When removing or detaching the sealing cap 20 from the compressor 10, a worker first inserts and hooks his/her fingers through the opening 33 of the first tab portion 24 and the opening 37 of the second tab portion 25. For example, the worker hooks the index finger through the opening 33 and the middle finger through the opening 37. Subsequently, the worker moves the fingers engaging with the openings 33 and 37 in a direction away from the pipe connecting portion 12 (in the direction indicated by blank arrows in FIGS. 6A and 6B), so that the sealing cap 20 is moved. The first connecting end 32A is connected to the end 28 of the body portion 21, and the second connecting end 32B is located closer to the first connecting end 32A than the center axis S1 of the first plug portion 22 is to the first connecting end 32A in the longitudinal direction of the body portion 21. Therefore, when the sealing cap 20 is pulled in the removing direction, the body portion 21 is deformed and the end 28 is lifted, which causes the first plug portion 22 to be tilted and removed from the suction port 14, as illustrated in FIG. 6A. In other words, the first plug portion 22 is removed from the suction port 14 by a pulling force exerted on the first tab portion 24.

Figure 6B:
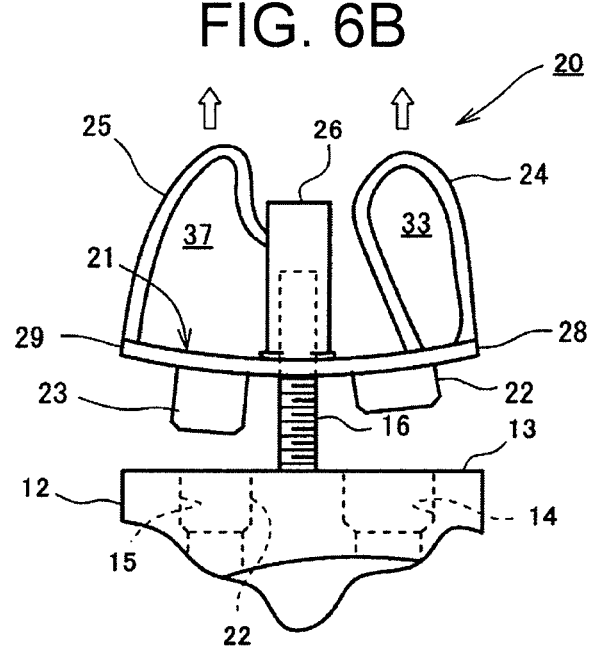
FIG. 6B is a view for describing a step of removal of the sealing cap according to the first embodiment.

The worker further pulls the sealing cap 20 in the direction away from the pipe connecting portion 12, with the fingers engaging with the first tab portion 24 and the second tab portion 25. In this pulling step, the second plug portion 23 is removed from the discharge port 15, mainly by means of the second tab portion 25. As illustrated in FIG. 6B, the bolt insertion portion 26 starts to be lifted, following the removal of the second plug portion 23. By pulling the sealing cap 20 further in the direction away from the pipe connecting portion 12, the bolt insertion portion 26 is detached from the stud bolt 16, so that the sealing cap 20 is detached completely from the pipe connecting portion 12.

In the steps of removing the sealing cap 20 according to the first embodiment, two fingers are hooked through the first tab portion 24 and the second tab portion 25. Therefore, the strain on the fingers is reduced as compared with a case of removing the sealing cap 20 with one finger. In addition, the first plug portion 22 and the second plug portion 23 are removed one by one instead of at the same time. According to the first embodiment, the first plug portion 22 and the second plug portion 23 are removed in this order and then the bolt insertion portion 26 is detached from the stud bolt 16. Thus, the worker can pull and remove the sealing cap 20 from the pipe connecting portion 12 easily with a smaller force.

The sealing cap 20 according to the first embodiment offers the following effects.

(1) The first tab portion 24 includes the ring 31 having an annular shape and is disposed opposite to the bolt insertion portion 26 across the first plug portion 22 in the longitudinal direction of the body portion 21. The ring 31 has an opening that extends through the ring 31 in the direction that crosses the insertion direction of the first plug portion 22. Therefore, when the sealing cap 20 is mounted to the compressor 10, the first tab portion 24 does not protrude from the edge of the body portion 21, so that the first tab portion 24 does not interfere with other components in the engine compartment. The ring 31 allows easy inserting of a worker's finger.

(2) The connecting ends 32 of the first tab portion 24 are connected to the longitudinal end 28 of the body portion 21 that is located on the side of the first plug portion 22. Part of the ring 31, or, especially the second connecting end 32B that is connected to the front surface 21A of the body portion 21 is located above the first plug portion 22. Therefore, during the removal of the sealing cap 20, the first plug portion 22 is removed while being deformed and tilted relative to an axial direction of the suction port 14 as the first fluid port. With this configuration, the force required for pulling the first plug portion 22 is reduced, as compared with the force required for simply pulling the first plug portion 22 in the direction of the center axis S1 of the first plug portion 22. The mounted sealing cap 20 does not interfere with the components and therefore is easy to remove from the compressor 10.

(3) The sealing cap 20 is adapted to plug the suction port 14 and the discharge port 15 of the pipe connecting portion 12 of the compressor 10 that has the stud bolt 16 disposed between the suction port 14 and the discharge port 15. During the removal of the sealing cap 20, the first plug portion 22 and the second plug portion 23 are removed in this order from the suction port 14 and the discharge port 15, respectively, and then the bolt insertion portion 26 is detached from the stud bolt 16. Thus, the suction port 14 and the discharge port 15 are plugged by means of a single body of the sealing cap 20, which is removable reliably from the compressor 10.

(4) The gap G1 is provided between the first tab portion 24 and the bolt insertion portion 26, and the gap G2 is provided between the second tab portion 25 and the bolt insertion portion 26. When mounting the stud bolt 16 to the compressor 10 using a tool, such as the impact wrench T, in a state that the sealing cap 20 is attached to the compressor 10, the impact wrench T enters the gaps G1 and G2. Thus, the gaps G1 and G2 prevent the interference between the sealing cap 20 and the tool, resulting in an efficient mounting or tightening of the stud bolt 16 to the compressor 10. Further, the end face 13 of the pipe connecting portion 12 is protected by the sealing cap 20 against the tool when mounting or tightening the stud bolt 16.

(5) The connecting ends 32 include the first connecting end 32A that is connected to the end 28 on the side of the first plug portion 22, and the second connecting end 32B that is located closer to the bolt insertion portion 26 than the first connecting end 32A is to the bolt insertion portion 26. The second connecting end 32B is located closer to the first connecting end 32A than the center axis S1 of the first plug portion 22 is to the first connecting end 32A in the longitudinal direction of the body portion 21. Therefore, during the removal of the sealing cap 20, the pulling force applied is greater at and around the end 28, so that the first plug portion 22 is removed quickly by the deformation and the tilting relative to the axial direction of the suction port 14.

(6) When the first tab portion 24, the second tab portion 25, and the bolt insertion portion 26 are not deformed or in a normal state, the dimension of the bolt insertion portion 26 in the direction of the center axis S3 is greater than the dimensions of the first tab portion 24 and the second tab portion 25 in the same direction. Therefore, the first tab portion 24 and the second tab portion 25 do not extend excessively in the direction of the center axis S3, which prevents the first tab portion 24 and the second tab portion 25 from interfering with the other components in the direction of the center axis S3.

(7) The second tab portion 25 and the bolt insertion portion 26 cooperate to form an annular shape. The second tab portion 25 includes the extension 34 that extends upright from the front surface 21A of the body portion 21 and then along the longitudinal direction of the body portion 21 while forming a curve. The extension 34 includes the first end 35 that is connected to the body portion 21 and the second end 36 that is connected to the outer peripheral surface of the bolt insertion portion 26. The second tab portion 25, the bolt insertion portion 26, and the body portion 21 cooperate to form the opening 37 that extends through the extension 34 in the direction that crosses the insertion direction of the second plug portion 23. Therefore, the opening 37 is of a size that is sufficient for a worker to readily insert a finger.

(8) When removing the sealing cap 20, two fingers are hooked through the first tab portion 24 and the second tab portion 25. Therefore, the strain on the fingers is reduced as compared with a case of removing the sealing cap 20 with one finger. In addition, the first plug portion 22, the second plug portion 23, and the bolt insertion portion 26 are removed in this order from the pipe connecting portion 12. Therefore, a worker can smoothly remove the sealing cap 20 with a smaller force as compared with a case of pulling the first plug portion 22 and the second plug portion 23 at the same time.

Second Embodiment

The following will describe a sealing cap according to a second embodiment of the present disclosure. The sealing cap of the second embodiment is adapted to plug the suction port only. In the second embodiment, the discharge port is to be plugged by a separate sealing cap. A compressor according to the second embodiment has the same configuration as that according to the first embodiment. Therefore, like reference numerals designate corresponding components and the detailed description thereof will be omitted or simplified. It is to be noted that the sealing cap for plugging the discharge port is not illustrated in the drawings.

Figure 7A:
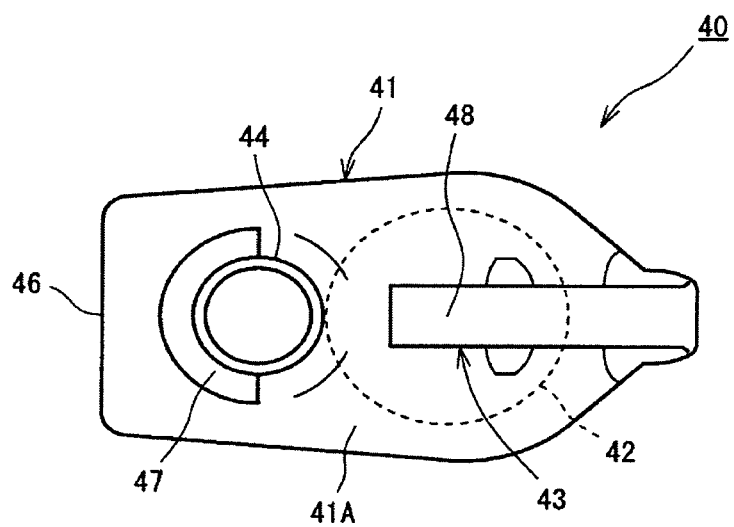
FIG. 7A is a plan view of a sealing cap according to a second embodiment of the present disclosure.
Figure 7B:
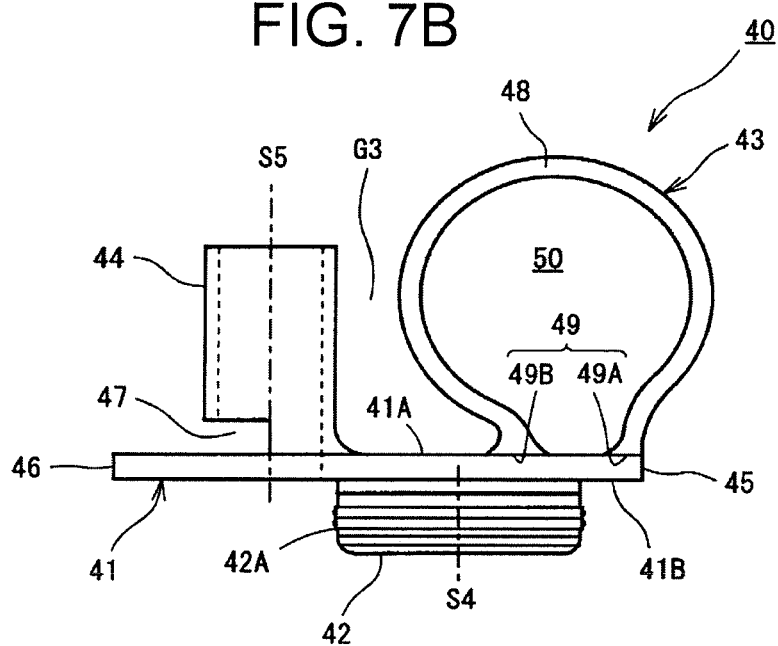
FIG. 7B is a side view of the sealing cap of FIG. 7A.

FIGS. 7A and 7B show a sealing cap 40 according to the second embodiment that is to be mounted to the pipe connecting portion 12 for plugging the suction port 14. The sealing cap 40 is made of the same material as the sealing cap 20 of the first embodiment. The sealing cap 40 includes a plate-like body portion 41, a plug portion 42, a tab portion 43, and a bolt insertion portion 44.

The plug portion 42, the tab portion 43, and the bolt insertion portion 44 are joined integrally by the plate-like body portion 41. The plate-like body portion 41 has opposite ends 45 and 46 in the longitudinal direction thereof. The plug portion 42 is projectingly formed on a rear surface 41B of the body portion 41 so as to be located on the side of the end 45 in the longitudinal direction of the body portion 41. The bolt insertion portion 44 is formed on a front surface 41A of the body portion 41 so as to be located on the side of the end 46 in the longitudinal direction of the body portion 41.

The plug portion 42 is formed in a columnar shape and includes an annular rib portion 42A that is formed along an outer peripheral surface of the plug portion 42. The plug portion 42 is substantially same as the first plug portion 22 of the first embodiment. The plug portion 42 extends along its center axis S4 that is orthogonal to the plane of the rear surface 41B of the body portion 41. The center axis S4 of the plug portion 42 is parallel with a center axis S5 of the bolt insertion portion 44. The bolt insertion portion 44 has a shape that permits insertion of the stud bolt 16. In the second embodiment, the base portion of the bolt insertion portion 44 has a cut portion that is opened on the side of the end 46 with respect to the center axis S5 of the bolt insertion portion 44. The body portion 41 has a semicircular cut portion that is located on the side of the end 46 with respect to the center axis S5. The two cut portions cooperate to constitute a void portion 47 of the sealing cap 40. With the void portion 47, removal of the plug portion 42 by pulling the tab portion 43 is facilitated. In a state that the sealing cap 40 is mounted on the pipe connecting portion 12, the stud bolt 16 is inserted in the bolt insertion portion 44 and the outer peripheral surface of the stud bolt 16 is covered by the bolt insertion portion 44.

The tab portion 43 is adapted to facilitate the removal of the sealing cap 40 from the pipe connecting portion 12. The tab portion 43 includes a ring 48 that stands upright on the front surface 41A at the end 45 and extends along a longitudinal direction of the body portion 41 while forming an annular shape. The tab portion 43 and the bolt insertion portion 44 are located opposite to each other across the plug portion 42. The ring 48 has opposite connecting ends 49 that are connected to the end 45, which is one longitudinal end of the body portion 41 on the side of the plug portion 42. The connecting ends 49 include a first connecting end 49A and a second connecting end 49B. The first connecting end 49A is connected to the end 45 of the body portion 41. The second connecting end 49B is connected at a position that is closer to the bolt insertion portion 44 than the first connecting end 49A is to the bolt insertion portion 44 in the longitudinal direction of the body portion 41. The second connecting end 49B is located at a position that is closer to the first connecting end 49A than the center axis S4 of the plug portion 42 is to the first connecting end 49A in the longitudinal direction of the body portion 41. The tab portion 43 protrudes from the end 45 in the longitudinal direction of the body portion 41 (the lengthwise direction) and does not protrude from the edges of the body portion 41 in a direction that is orthogonal to the longitudinal direction (that is, the width direction of the body portion 41).

The ring 48 having the first and second connecting ends 49A and 49B connected to the front surface 41A is formed upright in a direction away from the front surface 41A while forming an arcuate shape. The second connecting end 49B is connected to the front surface 41A, and part of the ring 48 is located above the plug portion 42. A gap G3 is provided between the ring 48 and the bolt insertion portion 44. The gap G3 increases as the ring 48 extends toward the body portion 41 and also away from the body portion 41 from a point in the ring 48 closest to the bolt insertion portion 44. When mounting the stud bolt 16 to the compressor using a tool, such as an impact wrench T, with the sealing cap 40 attached to the compressor, the gap G3 near the extending end of the bolt insertion portion 44 allows the tool to enter. The dimension of the tab portion 43 in the direction of the center axis S5 of the bolt insertion portion 44 is equal to or larger than the dimension of the bolt insertion portion 44 in the same direction.

The ring 48 has an opening 50 that extends through the ring 48 in the direction that crosses the insertion direction of the plug portion 42. The opening 50 permits a worker to insert a finger. The connecting ends 49 are connected to the end 45. Therefore, when the worker hooks a finger through the opening 50 and pulls the tab portion 43 up in the direction of removing the sealing cap 40 (i.e., in the direction that is parallel with the center axis S4), the body portion 41 is deformed in such a manner that the end 45 is lifted first and then the plug portion 42 is removed from the suction port 14. Thus, concentrating the pulling force to the part of the plug portion 42 near the end 45 will reduce the force required for removing the sealing cap 40, as compared with a case of simply pulling the plug portion 42 in the direction of the center axis S4 of the plug portion 42.

The sealing cap 40 according to the second embodiment also offers the effects (1), (3), and (4) of the first embodiment.

Third Embodiment

The following will describe a sealing cap according to a third embodiment of the present disclosure. The sealing cap of the third embodiment is adapted to plug the discharge hole only. In the third embodiment, the suction port is to be plugged by a separate sealing cap. A compressor according to the third embodiment has the same configuration as that according to the first embodiment. Therefore, like reference numerals designate corresponding components and the detailed description thereof will be omitted or simplified. It is to be noted that the sealing cap for plugging the suction port is not illustrated in the drawings.

Figure 8A:
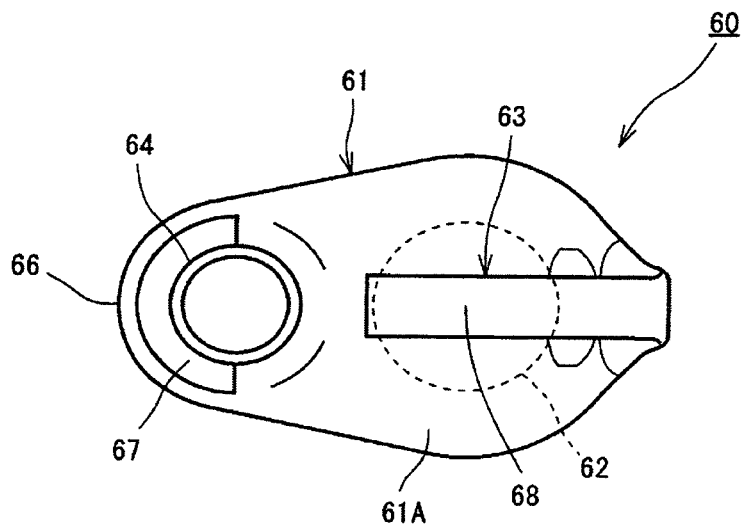
FIG. 8A is a plan view of a sealing cap according to a third embodiment of the present disclosure.
Figure 8B:
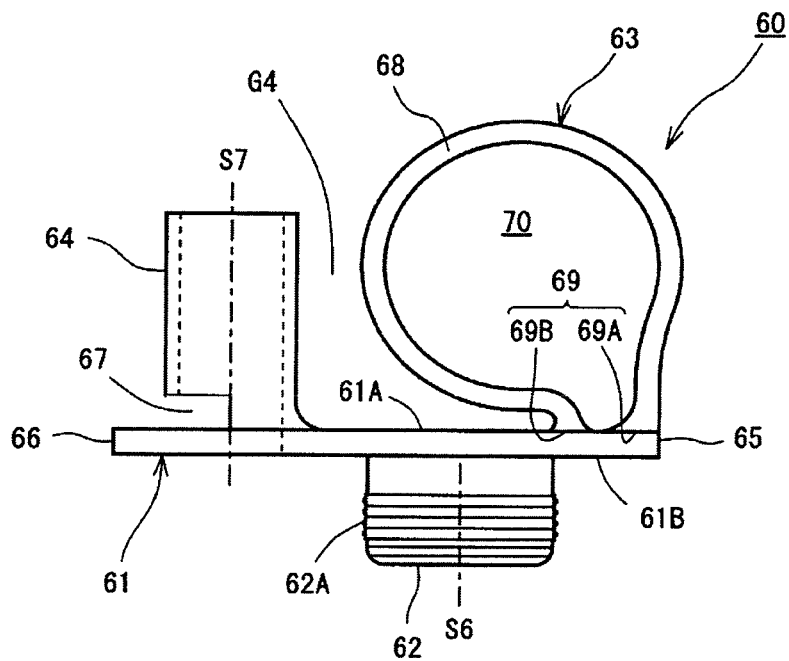
FIG. 8B is a side view of the sealing cap of FIG. 8A.

FIGS. 8A and 8B show a sealing cap 60 according to the third embodiment that is to be mounted to the pipe connecting portion 12 for plugging the discharge port 15. The sealing cap 60 is made of the same material as the sealing cap 20 of the first embodiment. The sealing cap 60 includes a plate-like body portion 61, a plug portion 62, a tab portion 63, and a bolt insertion portion 64.

The plug portion 62, the tab portion 63, and the bolt insertion portion 64 are joined integrally by the plate-like body portion 61. The plate-like body portion 61 has opposite ends 65 and 66 in the longitudinal direction thereof. The plug portion 62 is projectingly formed on a rear surface 61B of the body portion 61 so as to be located on the side of the end 65 in the longitudinal direction of the body portion 61. The bolt insertion portion 64 is formed on a front surface 61A of the body portion 61 so as to be located on the side of the end 66 in the longitudinal direction of the body portion 61.

The plug portion 62 is formed in a columnar shape and includes an annular rib portion 62A that is formed along an outer peripheral surface of the plug portion 62. The plug portion 62 is substantially same as the second plug portion 23 of the first embodiment. The plug portion 62 extends along its center axis S6 that is orthogonal to the plane of the rear surface 61B of the body portion 61. The center axis S6 of the plug portion 62 is parallel with a center axis S7 of the bolt insertion portion 64. The bolt insertion portion 64 has a shape that permits insertion of the stud bolt 16. In the third embodiment, the base portion of the bolt insertion portion 64 has a cut portion that is opened on the side of the end 66 with respect to the center axis S7 of the bolt insertion portion 64. The body portion 61 has a semicircular cut portion that is located on the side of the end 66 with respect to the center axis S7. The two cut portions cooperate to constitute a void portion 67 of the sealing cap 60. With the void portion 67, removal of the plug portion 62 by pulling the tab portion 63 is facilitated. In a state that the sealing cap 60 is mounted on the pipe connecting portion 12, the stud bolt 16 is inserted in the bolt insertion portion 64 and the outer peripheral surface of the stud bolt 16 is covered by the bolt insertion portion 64.

The tab portion 63 is adapted to facilitate the removal of the sealing cap 60 from the pipe connecting portion 12. The tab portion 63 includes a ring 68 that stands upright on the front surface 61A of the body portion 61 at the end 65 and extends along a longitudinal direction of the body portion 61 while forming an annular shape. The tab portion 63 and the bolt insertion portion 64 are located opposite to each other across the plug portion 62. The ring 68 has opposite connecting ends 69 that are connected to the end 65, which is one longitudinal end of the body portion 61 on the side of the plug portion 62. The connecting ends 69 include a first connecting end 69A and a second connecting end 69B. The first connecting end 69A is connected to the end 65 of the body portion 61. The second connecting end 69B is connected to the body portion 61 at a position that is closer to the bolt insertion portion 64 than the first connecting end 69A is to the bolt insertion portion 64 in the longitudinal direction of the body portion 61. The second connecting end 69B is located at a position that is closer to the first connecting end 69A than the center axis S6 of the plug portion 62 is to the first connecting end 69A in the longitudinal direction of the body portion 61. The tab portion 63 slightly protrudes from the end 65 in the longitudinal direction of the body portion 61 (the lengthwise direction) and does not protrude from the edges of the body portion 61 in a direction that is orthogonal to the longitudinal direction (the width direction).

The ring 68 having the first and second connecting ends 69A and 69B connected to the front surface 61A is formed upright in a direction away from the front surface 61A while forming an arcuate shape. Part of the ring 68 is located above the plug portion 62 with the front surface 61A intervening therebetween. A gap G4 is formed between the ring 68 and the bolt insertion portion 64. The gap G4 increases as the ring 68 extends toward the body portion 61 and also away from the body portion 61 from a point in the ring 68 closest to the bolt insertion portion 64. When mounting the stud bolt 16 to the compressor using a tool, such as the impact wrench T, in a state that the sealing cap 60 is attached to the compressor, the gap G4 near the extending end of the bolt insertion portion 64 allows the tool to enter. The dimension of the tab portion 63 in the direction of the center axis S7 of the bolt insertion portion 64 is equal to or larger than the dimension of the bolt insertion portion 64 in the same direction.

The ring 68 has an opening 70 that extends through the ring 68 in the direction that crosses the insertion direction of the plug portion 62. The opening 70 permits a worker to insert a finger. The connecting ends 69 are connected to the end 65. Therefore, when the worker hooks a finger through the opening 70 and pulls the tab portion 63 up in the direction of removing the sealing cap 60 (i.e., in the direction that is parallel with the center axis S5), the body portion 61 is deformed in such a manner that the end 65 is lifted first and then the plug portion 62 is removed from the discharge port 15. Thus, applying the pulling force to the part of the plug portion 62 near the end 65 will reduce the force required for removing the sealing cap 60, as compared with a case of simply removing the sealing cap 60 in the direction of the center axis S6 of the plug portion 62.

The sealing cap 60 according to the third embodiment also offers the effects (1), (3), and (4) of the first embodiment.

Although the sealing cap of the present disclosure has been described in connection with the above first to third embodiments, it should be understood that the present disclosure should not be limited to the above embodiments and various modifications may be made without departing from the scope of the present disclosure.

In the above embodiments, the sealing cap is mounted to a compressor to be mounted on a vehicle. However, the application of the compressor is not particularly limited to the vehicle. In addition, the type of the compressor is not particularly limited, and may include a swash plate type, a scroll type, and a vane type.

In the above embodiments, the sealing cap is mounted to the pipe connecting portion formed on a housing of a compressor. However, the pipe connecting portion may not be formed on the housing and may alternatively be provided on a different part or component of the housing.

In the above embodiments, the suction port, the stud bolt, and the discharge port are arranged so that their centers are located on an imaginary line. However, the centers of the suction port, the stud bolt, and the discharge port may be shifted relative to each other. In such case, the first plug portion, the bolt insertion portion, and the second plug portion of the sealing cap will be shifted relative to each other in accordance with the positions of the suction port, the stud bolt, and the discharge port.

In the above embodiments, the end surface of the pipe connecting portion of the compressor is horizontal and the openings of the suction port and the discharge port are located at the same level. However, the configuration of the pipe connecting portion is not limited thereto. The compressor may be fixed within an engine compartment in such a manner that the openings of the suction port and the discharge port are located at different levels.

In the first embodiment, the second tab portion is connected to the bolt insertion portion. However, the second tab portion may have a shape like the first tab portion, without being connected to the bolt insertion portion. In this case, a larger gap can be provided that prevents interference between a tool and the bolt insertion portion.

In the above embodiments, the shape of the tab portions is not particularly limited as long as the tab portions are easy to hook when removing the sealing cap from the pipe connecting portion. Further, the tab portions may not protrude from the edges of the body portion in the longitudinal direction thereof in order to prevent interference with other peripheral components.

What is claimed is:

1. A sealing cap configured to be used for a compressor including a pipe connecting portion to which a pipe for flowing a fluid therethrough is to be connected, a fluid port that is opened to an end face of the pipe connecting portion, and a stud bolt that extends from the end face of the pipe connecting portion, the sealing cap being made of an elastically-deformable material and comprising:

a plug portion that is configured to be inserted into the fluid port to plug the fluid port, a bolt insertion portion that has a cylindrical shape, and is configured to permit insertion of the stud bolt;

a tab portion that is configured to be gripped; and a plate-like body portion that integrally joins the plug portion, the bolt insertion portion, and the tab portion, the bolt insertion portion extending from a front surface of the body portion, the tab portion being formed on the front surface of the body portion, the plug portion being projectingly formed on a rear surface of the body portion, wherein the tab portion includes a ring having an annular shape and is located opposite to the bolt insertion portion across the plug portion, the ring has an opening that extends through the ring in a direction that is orthogonal to an insertion direction of the plug portion and to a direction in which the plug portion and the bolt insertion portion are arranged orthogonal to the insertion direction, and a part of the ring is connected to the front surface of the body portion so as to be located above the plug portion.

2. The sealing cap according to claim 1, wherein the fluid port forms a first fluid port, the plug portion forms a first plug portion, the tab portion forms a first tab portion, the compressor includes a second fluid port that is opened to the end face of the pipe connecting portion, the stud bolt is located between the first fluid port and the second fluid port, and the sealing cap includes:

a second plug portion that is to be inserted into the second fluid port to plug the second fluid port, the second plug portion being formed integrally with the body portion and projectingly formed on the rear surface of the body portion; and a second tab portion that is configured to be gripped and formed on a part of the front surface of the body portion that is on a side of the second plug portion.

3. The sealing cap according to claim 1, wherein a dimension of the tab portion in an axial direction of the bolt insertion portion is equal to or smaller than a dimension of the bolt insertion portion in the axial direction thereof.

4. The sealing cap according to claim 2, wherein the second tab portion and the bolt insertion portion cooperate to form an annular shape.

5. The sealing cap according to claim 1, wherein the part of the ring comprises a first connecting end and a second connecting end both connected to the front surface of the body portion so as to be located opposite to the bolt insertion portion across the plug portion, the first connecting end being connected to the front surface at an end of the body portion in a longitudinal direction of the body portion, and the second connecting portion being connected to the front surface at a position closer to the bolt insertion portion than the first connecting end.

* * * * *